(12) United States Patent
Rankin

(10) Patent No.: US 11,452,064 B2
(45) Date of Patent: Sep. 20, 2022

(54) LOCATING AND DETECTING MOBILE COMMUNICATION DEVICES IN A DEFINED GEOGRAPHIC AREA

(71) Applicant: John Rankin, Williamsport, OH (US)

(72) Inventor: John Rankin, Williamsport, OH (US)

(73) Assignee: Rankin Labs, LLC, Williamsport, OH (US)

( * ) Notice: Subject to any disclaimer, the term of this patent is extended or adjusted under 35 U.S.C. 154(b) by 0 days.

(21) Appl. No.: 17/194,675

(22) Filed: Mar. 8, 2021

(65) Prior Publication Data
US 2021/0314905 A1 Oct. 7, 2021

Related U.S. Application Data

(60) Provisional application No. 62/986,847, filed on Mar. 9, 2020.

(51) Int. Cl.
*H04W 64/00* (2009.01)
*G06Q 30/02* (2012.01)
(Continued)

(52) U.S. Cl.
CPC ...... *H04W 64/003* (2013.01); *G06Q 30/0241* (2013.01); *H04W 4/021* (2013.01); *H04W 64/006* (2013.01); *H04W 84/02* (2013.01)

(58) Field of Classification Search
CPC ..... H04W 12/06; H04W 12/08; H04W 12/12; H04W 12/122; H04W 12/126; H04W 4/80; H04W 4/02; H04W 12/63; H04W 4/029; H04W 88/02; H04W 12/37; H04W 88/08; H04W 8/005; H04W 48/02; H04W 64/00; H04W 48/16; H04W 24/08; H04W 84/18; H04W 12/30; H04W 72/042; H04W 12/64; H04W 12/10; H04W 8/24; H04W 12/65; H04W 12/72; H04W 12/00; H04W 8/183;
(Continued)

(56) References Cited

U.S. PATENT DOCUMENTS 8,000,269 B1 * 8/2011 Rae .................. H04M 7/006
370/269
9,405,016 B2 8/2016 Yim
(Continued)

OTHER PUBLICATIONS ip.com. Method for Predicting and Targeting Advertising to Nearby Customers on Electronic Map, Oct. 20, 2014.
(Continued)

*Primary Examiner* — Kwasi Karikari
(74) *Attorney, Agent, or Firm* — Standley Law Group LLP; Jeffrey S. Standley; Adam J. Smith

(57) ABSTRACT

Systems and methods for identifying suspected contraband mobile electronic devices within a confined community are provided. Details regarding said advertising opportunities are monitored from central advertising providers. A subset of the mobile electronic devices associated with advertising opportunities noting location measurements within a perimeter geofence of the confined community are identified and any such devices also associated with advertising opportunities noting location measurements outside of the perimeter are eliminated to arrive at a revised subset. The published details of the advertising opportunities for those mobile electronic devices in the revised subset are recorded.

20 Claims, 5 Drawing Sheets

(51) Int. Cl.
*H04W 4/021* (2018.01)
*H04W 84/02* (2009.01)

(58) Field of Classification Search
CPC ......... H04W 4/33; H04W 4/21; H04W 12/75;
H04W 8/205; H04W 8/20; H04W 12/108;
H04W 12/67; H04W 12/80; H04W 12/40;
H04W 72/0426; H04W 8/06; H04W
12/102; H04W 60/06; H04W 56/0015;
H04W 84/20; H04W 48/00; H04W 76/20;
H04W 76/22; H04W 28/22
See application file for complete search history.

(56) References Cited

U.S. PATENT DOCUMENTS

| | | | |
|---|---|---|---|
| 9,451,095 B2 | 9/2016 | Kahn et al. | |
| 9,615,064 B2 | 4/2017 | Millar et al. | |
| 9,854,087 B1* | 12/2017 | Solid | H04L 43/04 |
| 2004/0073364 A1 | 4/2004 | Jung et al. | |
| 2013/0018714 A1 | 1/2013 | George | |
| 2013/0162824 A1 | 6/2013 | Sung et al. | |
| 2014/0004817 A1* | 1/2014 | Horton | H04M 15/58 |
| | | | 455/405 |
| 2014/0309923 A1 | 10/2014 | Ricci | |
| 2015/0113028 A1 | 4/2015 | Boppana et al. | |
| 2015/0168175 A1 | 6/2015 | Abramson et al. | |
| 2015/0241231 A1 | 8/2015 | Abramson et al. | |
| 2015/0336015 A1 | 11/2015 | Blum et al. | |
| 2016/0196577 A1 | 7/2016 | Reese et al. | |
| 2016/0335659 A1 | 11/2016 | Lewis et al. | |
| 2017/0067747 A1 | 3/2017 | Ricci | |
| 2018/0167774 A1* | 6/2018 | Hodge | H04W 4/029 |
| 2020/0380563 A1 | 12/2020 | Shiffert et al. | |
| 2021/0042791 A1 | 2/2021 | Rankin | |

OTHER PUBLICATIONS

Chanchary, F. et al., Use Perceptions of Sharing, Advertising, and Tracking, 2015 Symposium on Usable Privacy and Security, pp. 53-67.

John, L. et al., Ads That Don't Overstep, Harvard Business Review, 2018.

* cited by examiner

LOCATING AND DETECTING MOBILE COMMUNICATION DEVICES IN A DEFINED GEOGRAPHIC AREA

CROSS-REFERENCE TO RELATED APPLICATIONS

This application claims the benefit of U.S. Provisional Application Ser. No. 62/986,847 filed Mar. 9, 2020, the disclosures of which are hereby incorporated by reference as if fully restated herein.

TECHNICAL FIELD

Exemplary embodiments relate generally to systems and methods for locating and detecting mobile communication devices in a defined geographic area, such as within confined communities.

BACKGROUND AND SUMMARY OF THE INVENTION

There are a growing number of situations where the location and detection of mobile communication devices is important. One such example is within the modern prison system, such as but not limited to, the U.S. Federal Prison System.

One of the leading causes of safety and security breakdowns in the prison system is the introduction of contraband. While it is possible to arrange for contraband shipments and location drops through a prison visit, a common method is the use of electronic communication devices. While it might be possible to disable or block cellular communications within the prison system, this would disturb officers, staff, and surrounding non-prison related cellular communication. Therefore, most Federal prisons in the U.S. today are plagued by the presence and use of mobile devices. With these devices, inmates are able to continue to operate their external criminal enterprises, while safely being housed by the Federal Government.

Generally, most Federal prisons are organized into housing units. These units house groups of inmates, along with their support team and unit staff. Inmates that utilize mobile devices tend to share these devices with trusted members of their housing units. To ensure against discovery, trusted members in other housing units may be employed to hide or store the device. Regardless, the use and location of mobile devices can be predicted based upon observable patterns.

Many modern mobile devices function more than as simple telephonic communication devices. Instead, they provide a range of functions including connection to the internet. In order to avoid ownership identification, many inmates utilize internet-based functions of these smart devices, especially internet-based communication functions, and avoid using cellular services, because such cellular services can identify users if the mobile device is discovered. An example of such an internet-based communication function is the video chat feature available through a Facebook® account from Facebook, Inc., which allows users to exchange live feed of video and/or voice between active participants. Such video chat applications are available through other providers, including but not limited to, other social media providers, third party providers, and the like. Since at least some of these internet-based communication functions are available through websites, applications, or the like, such as but not limited to social media platforms, in many cases the inmate's use of the device will also provide an advertising opportunity.

Modern advertisers often utilize social media or other platforms to distribute and connect with potential customers. This is sometimes accomplished using paid advertisements that are presented on social media platforms such as, but not limited to, Facebook®, Twitter®, and Pinterest®. When users utilize these social media platforms, they are typically presented with paid advertisements. These advertisements are generally presented in the form of images or video clips and may be provided as GIFs, JPGs, or WAV files, for example. When the social media provider builds its web page or application for a browser or mobile device platform, the web page or application is generally designed to incorporate a variety of strategically placed advertising spaces to be populated with paid advertisements. These advertising spaces may appear along the top, bottom or sides of the user content, for example, and may act as billboard space.

The advertising spaces are generally managed by a central provider which offers the space to advertisers who wish to connect with end users on the social media platform. The advertising process generally involves an offer to sell and an acceptance through a bidding process. In other words, the central provider generally presents the advertising space for bidding when the mobile device initiates the application that contains the advertising space. Once the advertising space has been presented for bidding, potential advertisers compete to utilize the ad space opportunity.

What is needed is a system and method which utilizes the elements of modern advertising to locate and detect mobile devices, particularly those used in a defined geographic area, such as but not limited to, a confined community. Systems and methods are disclosed which utilize the elements of modern advertising to locate and detect mobile devices, particularly those used in a defined geographic area, such as but not limited to, a confined community. One exemplary objective of the present disclosures is to locate and identify mobile devices being used in confined communities where the presence of mobile devices is restricted or otherwise limited. Rather than utilizing the advertising opportunity, the disclosed systems and methods utilize the bid offers to locate mobile devices and track their movements. By using the bid/offer data that is presented from an advertising exchange, it is possible to determine location and movement of the devices. This information may be correlated into movement patterns to isolate mobile devices that are presumably being utilized for nefarious activities and/or user sharing. By combining these elements, the disclosed systems and methods can aid in the location, discovery, and subsequent elimination of mobile devices in confined communities, such as but not limited to, prisons. Furthermore, by examining repeatable patterns of device movement, it is possible to differentiate between nefarious users and simply natural participants in the environment. For example, without limitation, it is possible to determine if a device is being hidden, used in a conspiracy of behavior patterns, and nefariously being used.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
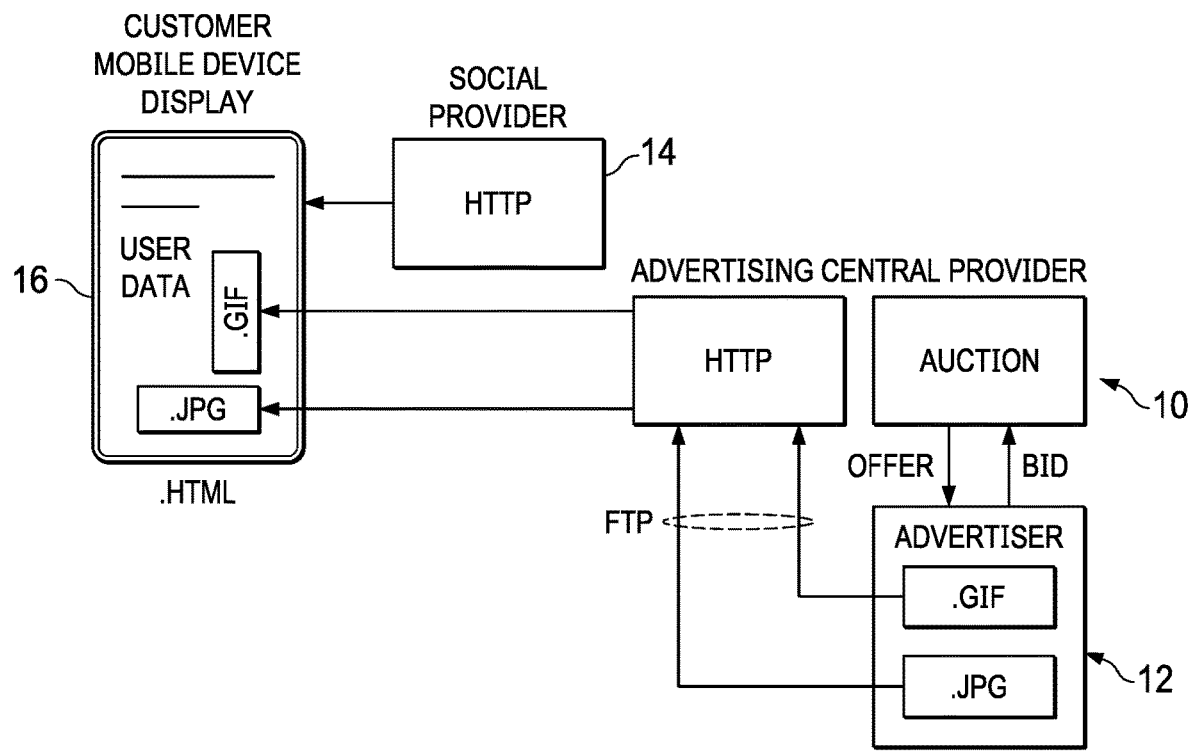
FIG. 1 illustrates exemplary modern advertising.

As illustrated in FIG. 1, an advertiser 12 may gain the ability to utilize advertising space on a social medial platform 16, such as through a central provider 10. The advertiser 12 may be the successful bidder for a given ad space, and may transmit one or more files containing the advertising materials to be provided at the given ad space to the central provider 10. The formats of such files may vary depending upon the requirements of the central provider 10 and/or the potential space limitations from the HTML or other format document that will ultimately be displayed with the ad space. Since the central provider 10 is generally the owner of the sever (e.g., HTTP server) that distributes the graphic advertising content containers located on the display document (e.g., HTML display document), the central provider 10 may distribute the bid winner's 12 content for publication on the advertising platform 16, which may be social media or another document or provider.

The advertising platform 16 may comprise a number of pages. The pages may be HTML or other format pages and may comprise of a number of dynamic objects, all of which may be provided by the same or different sources. When a provider 14, such as but not limited to a social media provider, designs the user data display, the provider 14 generally has a myriad of choices for display content. When the provider 14 contracts with the central provider 10 to sell parts of their user display for advertising, the central provider 10 generally provides content URLs that will be supplanted with the sold content. Therefore, these areas of the advertising platform 16 may be dynamically changed and the central provider 10 may be provided with complete control over such displays.

Bid Offer Information and Geofencing

Figure 2:
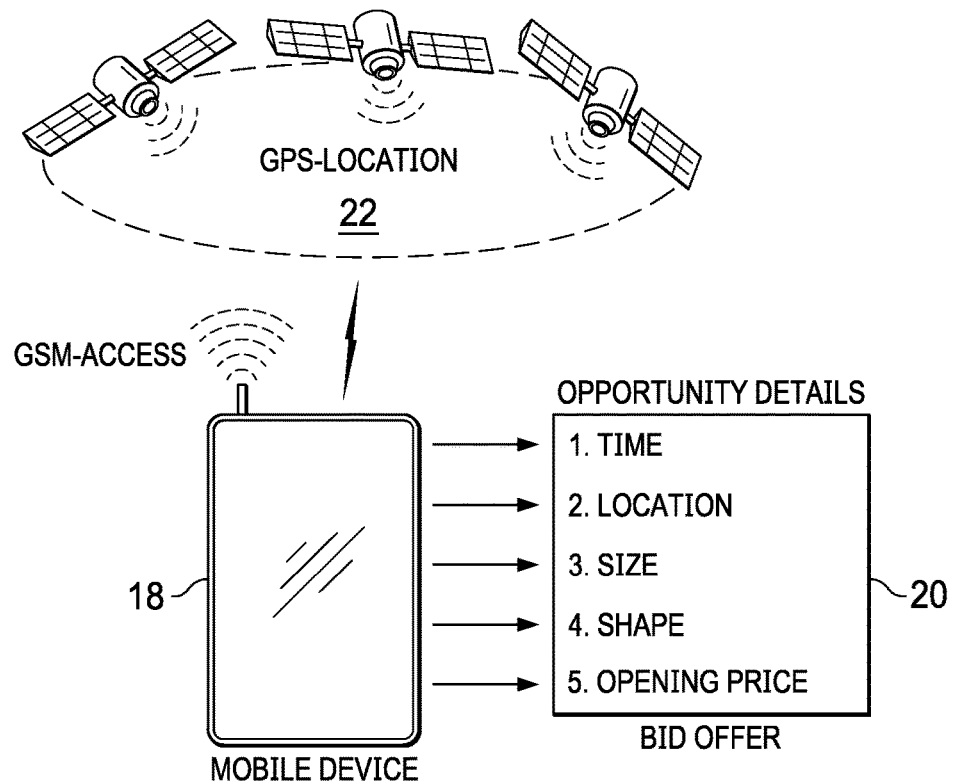
FIG. 2 illustrates exemplary advertising bidding.

The advertising opportunity that is put out for bids may contain opportunity details 20, such as but not limited to, as illustrated in FIG. 2. The details 20 may include, for example without limitation, the time, location, size, shape, opening price, combinations thereof, or the like, for the advertising space in question. The potential advertiser 12 may choose to bid on one or more opportunities based upon these details 20. The size and shape of the advertising space generally controls selection based upon content choices. The time and location may be generally dynamically changing, and is generally based entirely upon the location of the mobile device 18. The bidding advertiser 12 may start to bid on the opportunity space at a beginning price, such as but not limited to the opening price, and multiple bidders may compete until the closing opportunity moment. Since location, often in the form of latitude/longitude coordinates, may be available to the bidder, it is possible to select for one or more particular geographic areas. Advertisers 12 may be able to target their bids based upon where and when they want the ads to appear. Since the bid offer for mobile devices 18 may include location information, it is possible to confine advertising to a small and confined geographic area(s).

Furthermore, it is common for some advertisers 12 to define a geographic polygon that surrounds a specific location for distribution of the advertising content. This is often referred to as "geofencing", where the advertiser 12 defines a confinement area 22 and only bids on opportunities within the confinement or geofence 22. For example, without limitation, a small Italian restaurant wanting to limit their advertising budget might geofence well known Italian restaurants within a short driving distance and advertise only to patrons of the other well-known Italian restaurants. As further example, without limitation, a convention center that is holding a conference of quilters may be geofenced. During the conference, quilting supply companies could bid on opportunity space within mobile devices within the geofenced convention center.

Once a mobile device 18 has been identified by the central advertising provider 10 it may be assigned a unique identifier. This identifier may remain constant and connected with the specific mobile device 18, which may in turn be associated with a specific owner or user. This may permit the advertiser 12, central provider 10, combinations thereof, or the like to monitor future bid offers to locate the unique identifier assigned to a particular mobile device 18 and provide follow-up advertising.

Figure 3:
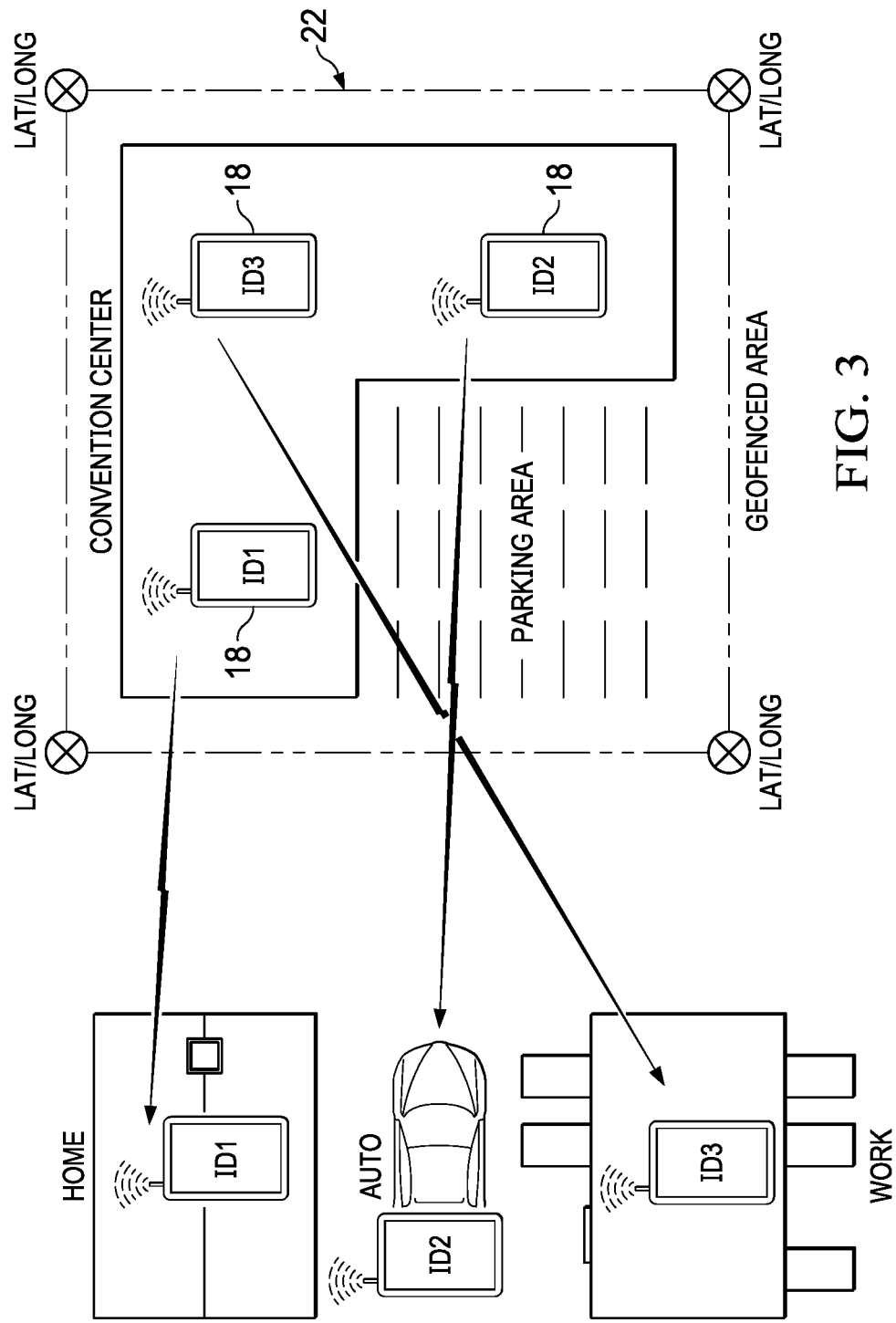
FIG. 3 illustrates exemplary geofencing.

As is illustrated, as an example without limitation, in FIG. 3, three mobile devices 18 having advertising opportunities are isolated within a geofenced 22 convention center. The convention center, in the illustrated example, is geofenced 22 so that the advertiser 12 can locate the advertising opportunities within the space. As those of skill in the art will recognize, any size, shape, and number of geofenced areas 22 may be utilized that may correspond with any number of locations. Once the devices 18 within the geofence 22 have been labeled with an identifier (provided as ID1, ID2, and ID3 in the illustrated example, without limitation), the devices 18 may be subsequently located in other geographic areas by monitoring for bid data 20 comprising the identifier. For example, without limitation, FIG. 3 illustrates that the mobile devices 18 may be monitored as they exit the geofenced 22 convention center and travel to home, a car, work, combinations thereof, or the like.

In this way, the modern advertiser 12 is able to push advertising to specific customers 18 while these customers 18 travel over a period of time (e.g., hours, days, weeks, months, etc.). The initial point of discovery is used only to identify the target devices 18 which may be subsequently observed for a period of time. As a further example, without limitation, a flower shop might geofence 22 their own establishment in order to identify their own customers 18. Throughout the following days, weeks, etc., this same shop, as an advertiser 12, may push ads that identify specials and additional offers that could cause these customers 18 to return.

Though some discussion is provided herein with regards to HyperText Transfer Protocol ("HTTP") and/or Hypertext Markup Language ("HTML"), it is contemplated that other protocols, languages, and/or formats may be utilized along with equipment for the same.

Figure 4:
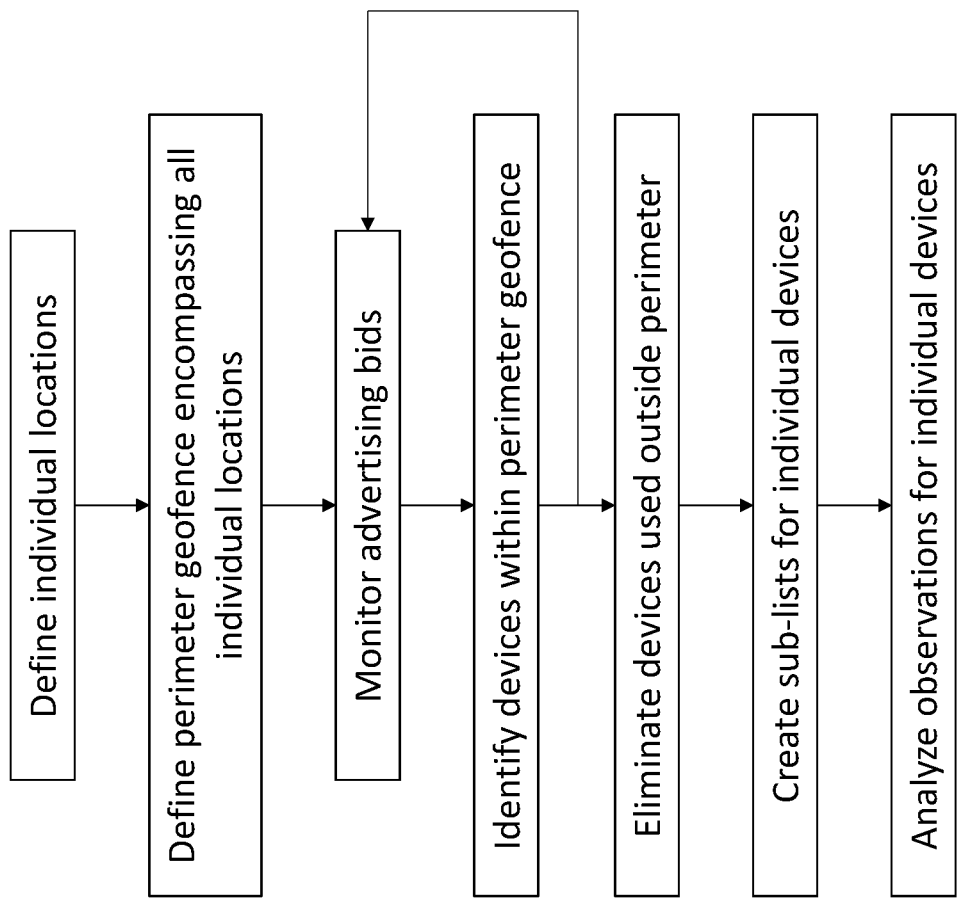
FIG. 4 is a flow chart illustrating exemplary logic for detecting mobile devices within geographic areas.

Such modern advertising practices may be utilized to aid in the location, discovery, and subsequent elimination of mobile devices 18 in confined communities 26, such as but not limited to, prisons. Such detection systems and methods may involve specific aspects or steps which are provided herein and which are illustrated in FIG. 4. One or more individual locations may be defined and geofenced 22. Advertising opportunities may be monitored, and mobile devices 18 within the geofenced areas 22 may be identified, such as but not limited to, by the identifiers within the details 20 of the advertising opportunities within such geofenced areas 22. Mobile devices 18 having identifiers also found outside the geofenced areas 22 may be eliminated, as those likely belong to persons not confined to the geofenced areas 22. Sub-lists for individual devices 18, such as by identifier, may be generated to monitor locations and other details of the devices 18. The data on the sub-lists may be analyzed to identify common locations of the mobile device 18.

In exemplary embodiments, without limitation, advertising opportunities within the geofenced areas 22A-D may be monitored to generate a list of mobile devices 18 within the geofenced areas 22A-D. Subsequent monitoring for advertising opportunities may be performed to further identify any of the mobile devices 18 in the list associated with advertising opportunities outside of the geofenced areas 22A-D, which may be eliminated from the list. As another example, without limitation, advertising opportunities within the geofenced areas 22A-D and within a predetermined range outside of the geofenced areas 22A-D may be monitored to generate a list of mobile devices 18 within the geofenced areas 22A-D and not found outside the geofenced areas 22A-D.

Figure 5:
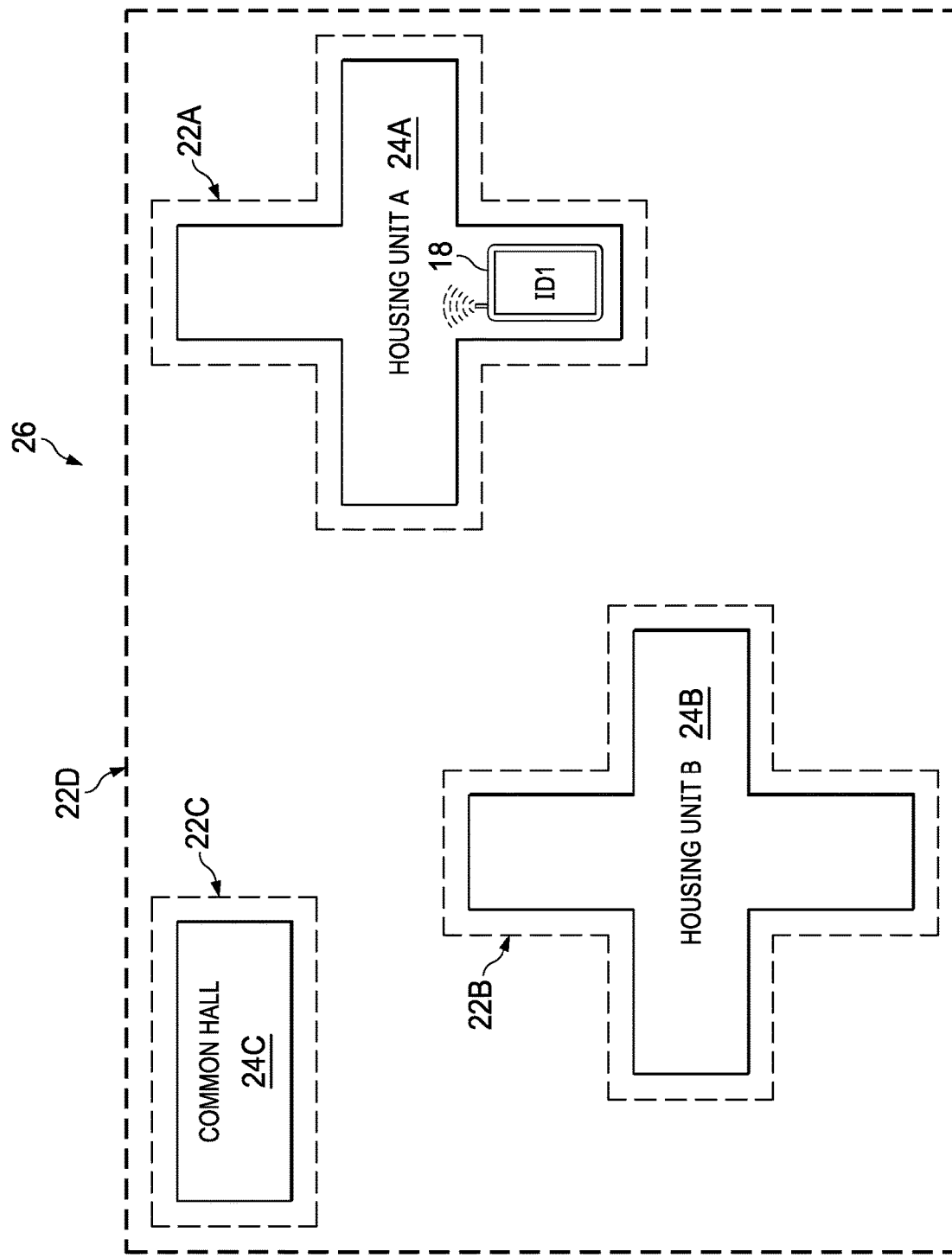
FIG. 5 illustrates exemplary geofencing of an exemplary confined community.

FIG. 5 provides exemplary geofenced areas 22A-D within an exemplary confined community 26. The confined community 26, such as but not limited to a prison, may comprise one or more buildings or other geographically identifiable locations or areas 24A-C, each of which may be defined. In the illustrated exemplary embodiment, the confined community 26 comprises a first and second housing unit 24A and 24C as well as a common hall 24C. Of course, this is merely exemplary and is not intended to be limiting. Any number and type of buildings, structures, areas, or the like are contemplated, some or all of which may be geofenced, individually or in one or more groups. These may include buildings, fenced yards, complexes, combinations thereof, or the like.

The various locations 24A-C may each be individually geofenced. Such geofencing may be accomplished by providing a polygon or other metes-and-bounds type perimeter that surrounds the location(s) 24A-C. In the illustrated embodiment, a first geofence 22A is provided about the first housing unit 24A, a second geofence 22C is provided about the second housing unit 24B, and a third geofence 24C is provided about the common hall 22C. Any number of geofences 22 encompassing each, or more than one, locations 24 may be utilized. Each building within a larger complex may be isolated where individuals utilize, or potentially utilize, mobile devices 18. Each geofenced area 22 may be defined by latitudinal ("lat") and longitudinal ("long") pairs that enclose to form a complete surrounding, though other location measure or formats may be utilized. As a mobile device 18 enters or is utilized one of the geofenced areas 22A-C, the mobile device 18 may be identified as being located within one of locations 24A-C through the observation of bid/offering advertising data to the mobile device 18.

A single geographically identifiable area that encompasses all of the buildings 24A-C may be defined and geofenced 22D. In this way, a subset of geofenced objects 24A-C may exist within the entire perimeter geofence 22D. As a mobile device 18 enters or is utilized within the perimeter geofence 22D, the mobile device 18 may be identified as being located within the confined community 26 through the observation of bid/offering advertising data to the mobile device 18.

The bid/offer data coming from a connection to an advertising central provider 10 may represent the advertising opportunities from mobile devices 18. As devices 18 turn on and are used for communication and applications, advertising possibilities may occur. These opportunities may be bid out or offered for sale to the advertising community and may each comprise the advertising details 20. Since the perimeter geofence 22D encloses all the target areas 22A-C, bid/offer data may be collected for all bids/offers whose geographic location falls within the perimeter geofence 22D.

A list of mobile devices 18 observed within the perimeter geofence 22D may be compiled. The bid/offer data from the advertising central provider 10 may comprise location information in the form of Lat/Long coordinates, though any measure or format may be utilized. Furthermore, each bid/offer may comprise an identify that may be used to separately identify each mobile device 18. The identifier may comprise a unique alphanumeric string of characters, though any type or kind of identifier may be utilized. The complied list may contain the identifier, the time of the bid/offer, and the location data associated with the mobile device 18 at or about the time of the bid/offer, for example without limitation.

Utilizing the mobile device's 18 identifier, the mobile devices 18 in the list may be compared against bid/offer data from outside the perimeter geofence 22D to determine if any of the listed mobile devices 18 have been used outside of the confined community 26. Mobile devices 18 that have been observed outside of the perimeter geofence 22D may be eliminated from the list. In this way devices 18 that belong to passers-by, workers, or non-confined device users may be eliminated. Illicit users of mobile devices 18 do not typically have the ability to leave the confined community 26, and therefore, their devices 18 may be locatable only within the perimeter geofence 22D. It is within this area 22D that the devices 18 may be utilized, traded, and hidden. The perimeter geofence 22D may correspond with the confined community's property limits, a fence or other barrier, restricted areas, some combination thereof, or the like.

Once the list of observed devices 18 has been partially or completely generated, entries may be isolated which indicate observations with a specific building 22A-C. This is illustrated in an exemplary fashion herein by the exemplary observations of three exemplary devices 18A-18C at FIG. 6, and inventoried by Table 1, which is provided as an example, without limitation.

TABLE 1

Exemplary Inventory of Device Operations

|     | Lat. (x) | Long. (y) | Device ID | Time  |
| --- | -------- | --------- | --------- | ----- |
| 1.  | 84.9     | 49.7      | 102       | 14:32 |
| 2.  | 87.1     | 48.1      | 103       | 14:40 |
| 3.  | 87.1     | 48.3      | 103       | 14:50 |
| 4.  | 84.0     | 48.2      | 101       | 14:50 |
| 5.  | 86.5     | 47.6      | 103       | 14:51 |
| 6.  | 84.0     | 48.5      | 101       | 14:55 |
| 7.  | 86.5     | 51.1      | 102       | 14:56 |
| 8.  | 86.6     | 51.3      | 102       | 14:58 |
| 9.  | 86.7     | 51.1      | 102       | 15:10 |
| 10. | 86.8     | 51.4      | 102       | 15:14 |
| 11. | 87.3     | 48.3      | 103       | 15:15 |
| 12. | 87.4     | 48.2      | 103       | 15:16 |
| 13. | 85.0     | 49.5      | 102       | 15:16 |
| 14. | 86.6     | 47.4      | 103       | 15:30 |
| 15. | 83.8     | 48.2      | 101       | 15:45 |
| 16. | 84.8     | 49.8      | 102       | 15:50 |
| 17. | 86.7     | 47.7      | 103       | 16:10 |
| 18. | 85.1     | 49.8      | 102       | 16:11 |
| 19. | 83.7     | 48.4      | 101       | 16:11 |
| 20. | 86.6     | 47.6      | 103       | 16:20 |
| 21. | 87.0     | 49.4      | 102       | 16:25 |
| 22. | 83.8     | 48.6      | 101       | 17:10 |
| 23. | 87.2     | 49.6      | 102       | 17:15 |
| 24. | 87.3     | 49.5      | 102       | 17:30 |
| 25. | 86.7     | 47.6      | 103       | 17:50 |
| 26. | 86.8     | 47.4      | 103       | 17:54 |

Usage of mobile devices 18 within a confined community 26 are generally limited to tightly controlled devices, or devices that are shared or rented by multiple users. Activity of devices 18 within the confined community 26 often does not have the same pattern of use that might be exhibited by authorized usage. Unauthorized devices 18 are generally used in consistent locations, and have repeatable patterns of activity, based upon time, location and availability, for example without limitation. This may reflect time between guard checks or patrols, scheduled leisure time, scheduled sleep or eating times, scheduled activity time, during normal sleeping hours, during scheduled exercise time, combinations thereof, or the like.

The list of identified mobile devices 18 for the confined community 26 may be separated into sub-lists or categorized for each individual device 18A-C. This is illustrated by, for example without limitation, the complete list presented in Table 1. Examples of separate sub-lists produced from the full exemplary list of Table 1 is provided at Tables 2, 3, and 4, which are provided for example without limitation. Each separate table may correspond with a given one of the devices 18A-C observed and may include an organized series of position Latitude and Longitude coordinates or other location measurements. Examples of such lat/long or other location measurements interposed at a graphical representation of a given one of the locations 22A-C is provided at FIG. 6 as inventoried by device 18 from Tables 2, 3, and 4.

TABLE 2

Exemplary Observation of Device 18A

| Obs. | Lat.(x) | x − μ  | (x − μ)² | Long.(Y) | Y − μ  | (Y − μ)² |
| ---- | ------- | ------ | -------- | -------- | ------ | -------- |
| 1.   | 84.0    | 0.14   | 0.0196   | 48.2     | −0.18  | 0.0324   |
| 2.   | 84.0    | 0.14   | 0.0196   | 48.5     | 0.12   | 0.0144   |
| 3.   | 83.8    | −0.06  | 0.0036   | 48.2     | −0.18  | 0.0324   |

TABLE 2-continued

Exemplary Observation of Device 18A

| Obs. | Lat.(x)   | x − μ     | (x − μ)²   | Long.(Y)  | Y − μ     | (Y − μ)²   |
| ---- | --------- | --------- | ---------- | --------- | --------- | ---------- |
| 4.   | 83.7      | −0.16     | 0.0256     | 48.4      | 0.02      | 0.0004     |
| 5.   | 83.8      | −0.06     | 0.0036     | 48.6      | 0.22      | 0.0484     |
|      | Σx 419.3  |           | Σss 0.072  | ΣY 241.9  |           | Σss 0.128  |

| X | Y |
| --- | --- |
| $\mu = \frac{419.3}{5} = 83.86$ | $\mu = \frac{241.9}{5} = 48.38$ |
| $\sigma^2 = \frac{0.072}{5} = 0.0144$ | $\sigma^2 = \frac{0.128}{5} = 0.0256$ |
| $\sigma = \sqrt{0.0144} = 0.12$ | $\sigma = \sqrt{0.0256} = 0.16$ |

TABLE 3

Exemplary Observation of Device 18B

| Obs. | Lat.(x)   | x − μ  | (x − μ)²   | Long.(Y)  | Y − μ  | (Y − μ)²   |
| ---- | --------- | ------ | ---------- | --------- | ------ | ---------- |
| 1.   | 87.1      | 0.22   | 0.0484     | 48.1      | 0.28   | 0.0784     |
| 2.   | 87.1      | 0.22   | 0.0484     | 48.3      | 0.48   | 0.2304     |
| 3.   | 86.5      | −0.38  | 0.1444     | 47.6      | −0.22  | 0.0484     |
| 4.   | 87.3      | 0.42   | 0.1764     | 48.3      | 0.48   | 0.2304     |
| 5.   | 87.4      | 0.52   | 0.2704     | 48.2      | 0.38   | 0.1444     |
| 6.   | 86.6      | −0.28  | 0.0784     | 47.4      | −0.42  | 0.1764     |
| 7.   | 86.7      | −0.18  | 0.0324     | 47.7      | −0.12  | 0.0144     |
| 8.   | 86.6      | −0.28  | 0.0784     | 47.6      | −0.22  | 0.0484     |
| 9.   | 86.7      | −0.18  | 0.0324     | 47.6      | −0.22  | 0.0484     |
| 10.  | 86.8      | −0.08  | 0.0064     | 47.4      | −0.42  | 0.1764     |
|      | Σx 868.8  |        | Σss 0.916  | ΣY 478.2  |        | Σss 1.196  |

| X | Y |
| --- | --- |
| $\mu = \frac{868.8}{10} = 86.88$ | $\mu = \frac{478.2}{10} = 47.82$ |
| $\sigma^2 = \frac{0.916}{10} = 0.0916$ | $\sigma^2 = \frac{1.196}{10} = 0.1196$ |
| $\sigma = \sqrt{0.0916} = 0.30265$ | $\sigma = \sqrt{0.1196} = 0.345832$ |

TABLE 4

Exemplary Observation of Device 18C

| Obs. | Lat.(x)   | x − μ  | (x − μ)²    | Long.(Y)  | Y − μ  | (Y − μ)²   |
| ---- | --------- | ------ | ----------- | --------- | ------ | ---------- |
| 1.   | 84.9      | −1.27  | 1.6129      | 49.7      | −0.5   | 0.25       |
| 2.   | 86.5      | 0.33   | 0.1089      | 51.1      | 0.9    | 0.81       |
| 3.   | 86.6      | 0.43   | 0.1849      | 51.3      | 1.1    | 1.21       |
| 4.   | 86.7      | 0.53   | 0.2809      | 51.1      | 0.9    | 0.81       |
| 5.   | 86.8      | 0.63   | 0.3969      | 51.4      | 1.2    | 1.44       |
| 6.   | 85.0      | −1.17  | 1.3689      | 49.5      | −0.7   | 0.49       |
| 7.   | 84.8      | −1.37  | 1.8769      | 49.8      | −0.4   | 0.16       |
| 8.   | 85.1      | −1.07  | 1.1449      | 49.8      | −0.4   | 0.16       |
| 9.   | 87.0      | 0.83   | 0.6889      | 49.4      | −0.8   | 0.64       |
| 10.  | 87.2      | 1.03   | 1.0609      | 49.6      | −0.6   | 0.36       |
| 11.  | 87.3      | 1.13   | 1.2769      | 49.5      | −0.7   | 0.49       |
|      | Σx 947.9  |        | Σss 10.0019 | ΣY 552.2  |        | Σss 6.82   |

| X | Y |
| --- | --- |
| $\mu = \frac{947.9}{11} = 86.17$ | $\mu = \frac{552.2}{11} = 50.2$ |

TABLE 4-continued

Exemplary Observation of Device 18C

| Obs. | Lat.(x) | x − μ | (x − μ)² | Long.(Y) | Y − μ | (Y − μ)² |
|---|---|---|---|---|---|---|

$$\sigma^2 = \frac{10.0019}{11} = 0.909263 \qquad \sigma^2 = \frac{6.82}{11} = 0.62$$

$$\sigma = \sqrt{0.909263} = 0.95355 \qquad \sigma = \sqrt{0.62} = 0.7874$$

Once a specific device 18A-C has been inventoried within the geofence 22A-C associated with a specific one of the locations 24A-C, one or more analytical processes may be applied against both the location measurement. Such analytical processes include, but are not necessarily limited to: The sum of the values (Σx), the mean (μ) of the values, the sum of the squares (Σss) of the value minus the mean, the variance of the list of observations (σ2), and the standard deviation (σ) of the complete list of observations. These exemplary calculations are provided at Tables 2, 3, and 4 and pictographically represented in an exemplary fashion at FIG. 6. Observations of the device 18 may be presented as a labeled pair of intersection lines. The standard deviation of the observations may be illustrated as an oval centering around the intersection. Other forms of representation may be utilized. These types and kinds of analysis are merely exemplary and are not intended to be limiting. Any type or kind of operation, or combination of operations, may be provided against the data.

Figure 6:
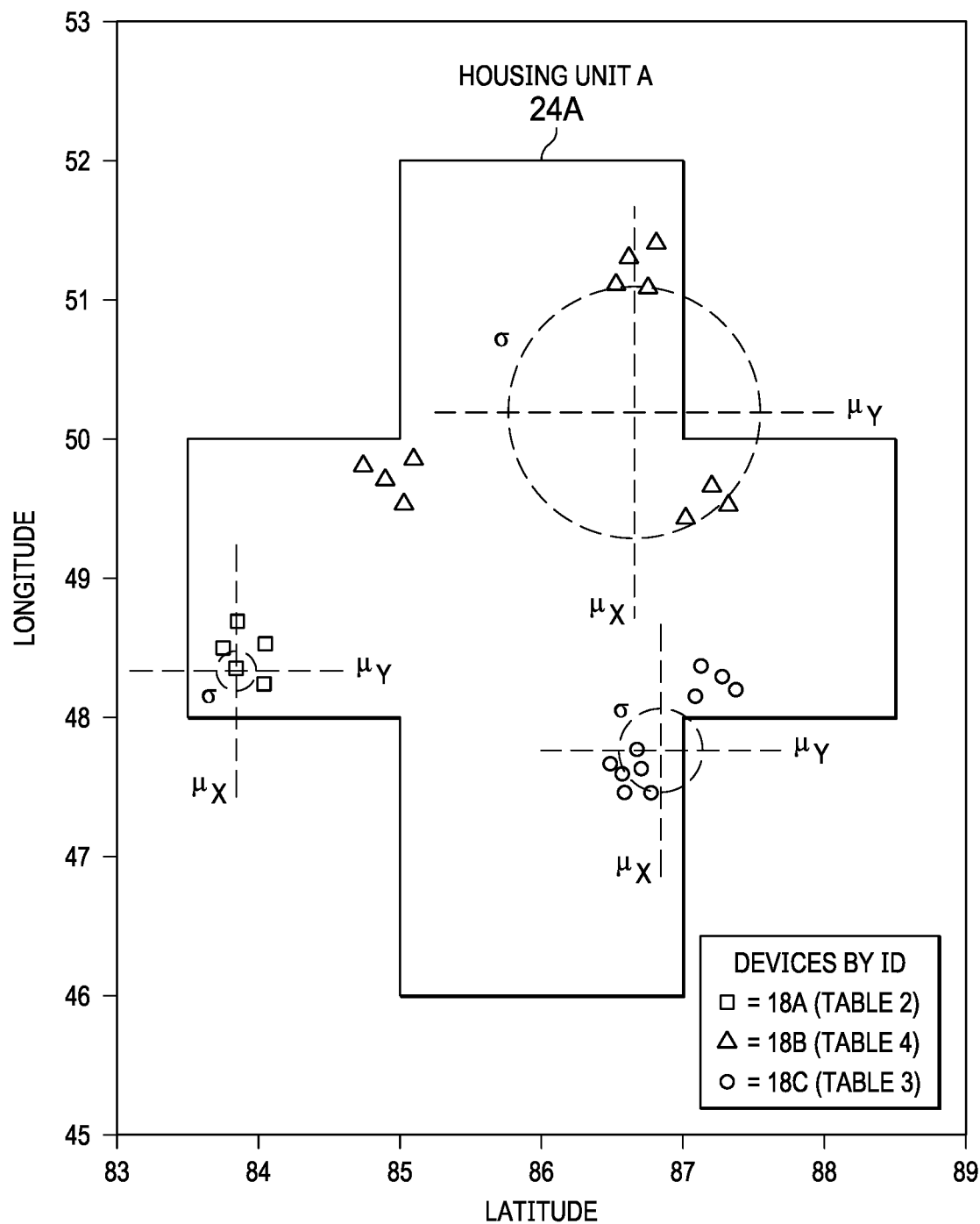
FIG. 6 illustrates exemplary device observation within an exemplary housing unit of the exemplary confined community of FIG. 5.

Device 18 activity that is limited to operations within a single building 24 may be classified by the observation of the standard deviation, as illustrated in FIG. 6, and Tables 2, 3, and 4. The smaller the standard deviation value, the more isolated is the device's 18 use. As the standard deviation increases in value, the more diverse the device's 18 use is within the building 24. The observation allows the separation of devices 18 into single user classifications, and shared or rented operations.

Devices having certain measures, such as but not limited to standard deviation values, meeting certain criteria (e.g., above or below a threshold, within a range, combinations thereof, or the like) may be automatically identified. In exemplary embodiments, an electronic notification regarding the same may be generated with the suspected location or suspected location area of the so-identified mobile device 18. Devices having certain measures, such as but not limited to standard deviation values, not meeting certain criteria (e.g., above or below a threshold, within a range, combinations thereof, or the like) may be automatically eliminated. For example, without limitation, devices 18 consistently found at or around a given location or locations may be flagged as being likely contraband. Such locations might be within restricted areas, quarters for confined individuals, between surveillance areas, at areas obstructed from normal view, combinations thereof, or the like, for example without limitation.

These values, notification, and/or graphical representations may be provided at one or more electronic devices in communication with a database comprising the observations. For example, without limitation, a display with a graphical representation of the confined community 26 may be generated with indicia indicating the suspected location area of suspected contraband mobile devices 18. As another example, a display with a graphical representation of the confined community 26 may be generated with indicia displayed at the visual representation in a manner visually correspondent to the location data in the details 20 of the opportunities received for each device 18. The indicia may be specific to the device 18, such as but not limited to, by shape, color, combinations thereof, or the like.

The detection of the devices 18, the analysis, and the like may be performed by one or more servers executing software instructions. The graphical representations shown and described herein are merely exemplary and are not intended to be limiting.

While three devices 18A-C are illustrated and described, any number of devices 18 in any number of locations 24 may be so observed. Some or all of the steps and/or features described herein may be repeated or recreated to observe multiple devices 18, locations 24, and/or communities 26.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphones, tablets, databases, servers, or the like. The electronic connections and transmissions described herein may be accomplished by wired or wireless means.

What is claimed is:

1. A method for identifying suspected contraband mobile electronic devices within a confined community, said method comprising the steps of:
    geofencing a perimeter encompassing said confined community;
    monitoring electronic advertising offers at one or more advertising exchanges, wherein each of said electronic advertising offers comprise at least location data and a device identifier;
    identifying, from the monitored electronic advertising offers, the electronic advertising offers having respective location data indicating a location within the perimeter to generate an initial listing of the suspected contraband mobile electronic devices, wherein said initial listing of the suspected contraband mobile electronic devices comprises each of the device identifiers associated with any of the identified electronic advertising offers;
    further identifying, from the monitored electronic advertising offers, other of the electronic advertising offers comprising one of the device identifiers found in the initial listing of the suspected contraband mobile electronic devices and associated with location data indicating a location outside of the perimeter;
    eliminating from the initial listing of the suspected contraband mobile electronic devices all entries associated with device identifiers in any of the further identified electronic advertising offers to generate a revised listing of the suspected contraband mobile electronic devices; and recording the location data and the device identifier for each of the electronic advertising offers associated with any of the device identifiers found in the revised listing of the suspected contraband mobile electronic devices.

2. The method of claim 1 wherein:

said location data comprises latitude and longitudinal measurements.

3. The method of claim 1 further comprising the steps of:

geofencing each of a number of buildings or areas within the confined community; and subdividing the recorded electronic advertising offer data by location data indicating a location associated with each respective one of the geofenced buildings or areas.

4. The method of claim 1 further comprising the steps of:

subdividing the recorded electronic advertising offer data by device identifier.

5. The method of claim 4 wherein:

each of said electronic advertising offers is associated with a time.

6. The method of claim 5 further comprising the steps of:

organizing the recorded electronic advertising offer data by time.

7. The method of claim 4 further comprising the steps of:

applying one or more analytical processes to said recorded electronic advertising offer data to arrive at one or more values.

8. The method of claim 7 wherein:

said one or more analytical processes comprise summing location measurements in the recorded electronic advertising offer data associated with at least one of said device identifiers in said revised listing of the suspected contraband mobile electronic devices.

9. The method of claim 7 wherein:

said one or more analytical processes comprise determining a mean value for location measurements in the recorded electronic advertising offer data associated with at least one of said device identifiers in said revised listing of the suspected contraband mobile electronic devices.

10. The method of claim 9 wherein:

said one or more analytical processes comprise summing of squares of the location measurements the recorded electronic advertising offer data associated with at least one of said device identifiers in said revised listing of the suspected contraband mobile electronic devices minus the corresponding mean value.

11. The method of claim 7 wherein:

said one or more analytical processes comprise determining a variance of locations measurements in the recorded electronic advertising offer data associated with at least one of said device identifiers in said revised listing of the suspected contraband mobile electronic devices.

12. The method of claim 7 wherein:

said one or more analytical processes comprise determining a standard deviation of location measurements in the location data in the recorded electronic advertising offer data associated with at least one of said device identifiers in said revised listing of the suspected contraband mobile electronic devices.

13. The method of claim 7 further comprising the steps of:

eliminating, from said revised listing of the suspected contraband mobile electronic devices, any entries associated with device identifiers in any of the recorded electronic advertising offer data associated with values falling outside of one or more predetermined criteria to arrive at a further revised listing of the suspected contraband mobile electronic devices.

14. The method of claim 1 further comprising the steps of:

generating a visual depiction of the confined community; and displaying indicia at the visual depiction at a location visually correspondent with location measurements in the location data for said recorded details associated with the mobile electronic devices in the subset.

15. The method of claim 14 wherein:

said indicia are color or shape coded in a manner specific to each of the one or more electronic devices in the subset.

16. A system for identifying suspected contraband mobile electronic devices within a confined community, said system comprising:

one or more central advertising providers in electronic communication with each of a number of mobile electronic devices, wherein each of said mobile electronic devices are configured to selectively retrieve websites or operate social media applications, and wherein each of said one or more central advertising providers are configured to publish details regarding advertising opportunities at each of said mobile electronic devices, wherein said details comprise identifiers for said mobile electronic devices and location data for said mobile electronic devices at the time of the advertising opportunity;

one or more electronic storage devices comprising software instructions, which when executed, configure one or more processors to:

monitor the published details of said advertising opportunities from said one or more central advertising providers;

identify, by the identifiers, a subset of the mobile electronic devices associated with advertising opportunities comprising location data indicating a location within a perimeter geofence of the confined community;

eliminate, from the subset of mobile electronic devices, any of the identified mobile electronic devices also associated with advertising opportunities comprising location data indicating a location outside of the perimeter to arrive at a revised subset of the subset of the mobile electronic devices; and record at least some of the published details of the electronic advertising offers for each of the mobile electronic devices in the revised subset.

17. The system of claim 16 further comprising:

additional software instructions stored at the one or more electronic storage devices, which when executed, configure the one or more processors to organize the recorded published details by identifier for each of the mobile electronic devices in the revised subset.

18. The system of claim 17 further comprising:

additional software instructions stored at the one or more electronic storage devices, which when executed, configure the one or more processors to:

perform at least one analytical operation on all recorded published details for each respective one of the mobile electronic devices in the revised subset to arrive at a respective value; and determine if each the respective values meets certain criteria.

19. The system of claim 18 further comprising:

additional software instructions stored at the one or more electronic storage devices, which when executed, configure the one or more processors to:

generate, for display at an electronic display, a visual depiction of the confined community; and identify, at the visual depiction, each of the mobile electronic devices in the revised subset associated with the respective value meeting the certain criteria.

20. A method for utilizing the elements of modern advertising on mobile devices for observation and tracking of individuals within confined communities, said method comprising the steps of:

identifying a series of buildings or definable locations where users of unauthorized mobile devices are suspected;

electronically defining the metes and bounds of each location by Latitude and Longitude coordinate pairs of each of a series of buildings;

electronically defining the metes and bounds of an enclosed compound which encompasses each of the series of buildings;

electronically collecting bid/offer data from an advertising exchange representing advertising opportunities provided to a mobile electronic device within the enclosed compound;

creating, from the collected bid/offer data, a comprehensive list of all mobile electronic devices used within the enclosed compound;

eliminating from the comprehensive list all mobile electronic devices that, from the collected bid/offer data, indicate activity outside of the enclosed compound to create a revised list;

creating sub-lists of device activity for each of the mobile electronic devices in the revised list;

isolating usage, from each of the sub-lists, within each of the series of buildings, wherein each data entry in each of said sub-lists comprises a latitudinal and longitudinal measurement;

calculating one or more of the following descriptive statistics for each of the sub-lists:
a sum of all values;
a mean of all values;
a sum of the squares of the value minus the mean;
a variance of all values; and
a standard deviation of all values.

* * * * *